Sept. 17, 1929.  P. T. LINDHARD  1,728,496

MANUFACTURE OF PORTLAND CEMENT

Filed Nov. 11, 1927

Inventor
Poul T. Lindhard
By his Attorneys
Redding, Greeley, O'Shea Campbell

Patented Sept. 17, 1929

1,728,496

UNITED STATES PATENT OFFICE

POVL T. LINDHARD, OF BROOKLYN, NEW YORK, ASSIGNOR TO F. L. SMIDTH & CO., OF NEW YORK, N. Y., A CORPORATION OF NEW JERSEY

MANUFACTURE OF PORTLAND CEMENT

Application filed November 11, 1927. Serial No. 232,519.

This invention is concerned particularly with the production of what is known in the cement industry as special Portland cement. In the manufacture of standard Portland cement, the cement clinker, with the addition of the proper percentage of raw gypsum, is reduced in a preliminary grinding to such a degree of fineness that approximately 90% of the material will pass a 20-mesh sieve. The material ground to this fineness is then subjected to a further grinding, by which it is reduced to such a degree of fineness that approximately 80% will pass a 200-mesh sieve, the material ground to this degree of fineness being known as standard Portland cement, or Portland cement of standard fineness. It has been found that certain desirable characteristics of the cement can be secured by carrying on the grinding to such an extent that approximately 98% of the material will pass a 200-mesh sieve, the material thus produced being known as special Portland cement, or Portland cement of special fineness. It has also been found that special Portland cement, although made from standard Portland cement of uniform quality, is sometimes subject to variations in quality. In the development of the present invention, it has been found that such variation in quality of special Portland cement is due to the loss by the raw gypsum of some of its water of crystallization and its consequent conversion into plaster of Paris. Not only does the desirable uniformity of the product suffer by reason of the varying extent to which the raw gypsum is converted into plaster of Paris, but the economy of production also suffers because in the final grinding, the grinding bodies are coated with a pellicle of fine material, which material reduces the capacity of the grinding apparatus and makes it necessary to reduce the feed of material. The lack of uniformity in the quality of the cement manifests itself in the behavior of the finished material, particularly with regard to the setting time, which may change considerably with the varying conversion of raw gypsum into plaster of Paris. It has also been found that the variation in quality of the finished material, by reason of the conversion of the raw gypsum to plaster of Paris, is due to the raising of the temperature of the material in the process of grinding above what is referred to herein as the critical temperature, that is, the temperature at which the raw gypsum is converted into plaster of Paris, this critical temperature being about 240° F.

The cement clinker is ordinarily delivered to the grinding mill at a temperature of between 125° F. and 150° F. In the grinding, the energy is partly converted into heat, which is imparted to the material. In the manufacture of standard Portland cement, the increase of temperature of the material thus brought about by the grinding, that is, the added heat, is not sufficient to raise the temperature of the material above the critical degree above mentioned and the standard cement produced is therefore of a uniform quality, if none of the raw gypsum has been converted into plaster of Paris. In the continued grinding of the material for the manufacture of special cement, the energy expended is probably increased as much as 80% and if the heat thus developed is added to the heat of the material as it comes from the grinding mill in which it is reduced to standard fineness, the temperature of the material is increased to a degree about or above the critical temperature, with the conversion of the raw gypsum to plaster of Paris to a greater or less extent, and corresponding variations in the uniformity of the product. The purpose in view in this invention has been to prevent such variation in the product due to the conversion of the raw gypsum to plaster of Paris by reason of a raising of the temperature of the material above the critical degree in the grinding. To this end the temperature of the material at or after the grinding to standard cement fineness is reduced to a degree below that at which the heat added in subsequent grinding would raise the temperature of the material above such critical degree, the grinding of the material to special cement fineness being then carried on.

The invention can be practised with apparatus of various forms, the grinding mills being of any suitable character and the devices for reducing the temperature of the material being likewise of such a character as may be suited to the preference of the manufacturer or the conditions under which the manufacturer is carried on, and being either independent of the grinding mills or incorporated with one or the other.

In the accompanying drawings, in which are illustrated different forms of apparatus adapted for the practise of the invention:

Figure 1:
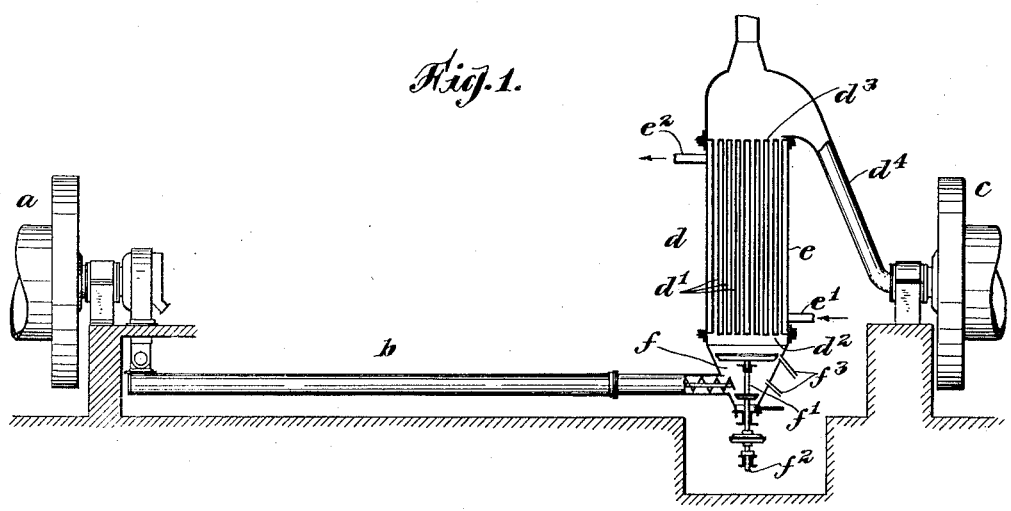
Figure 1 is an outline view in sectional elevation showing the cooling device interposed between two grinding mills.

In the embodiment of the invention illustrated in Figure 1, there is indicated at $a$ a portion of a grinding mill of ordinary construction, from which the cement material reduced therein to standard fineness, that is, such fineness that about 80% will pass a 200-mesh sieve, is delivered to a conveyor $b$. The temperature attained by the material in the grinding mill $a$, if the clinker is properly cooled and the grinding is carired on under proper conditions, will ordinarily be from 200° F. to 240° F. If the material from the mill $a$, at or near the temperature stated, were delivered directly to the mill $c$, in which the material is reduced to special cement fineness, that is, to a fineness such that about 98% will pass a 200-mesh sieve, in which reduction the energy expended is probably increased by about 80%, the heat imparted to the material, added to the temperature of from 200° F. to 240° F., would raise the temperature of the material to a degree considerably higher than 240° F., which may be taken as the critical temperature at which the conversion of raw gypsum into plaster of Paris begins, the conversion progressing with the increase of temperature. Furthermore, under such conditions the grinding bodies in the second mill would become coated with a pellicle of fine material with the result of loss of efficiency and reduction in capacity of the mill. Such reduction in capacity would make it necessary to reduce the feed to the mill, with a consequent increase in the transmission of heat to the material, whereby the conversion of raw gypsum into plaster of Paris would be further promoted and the quality of the finished product further affected.

For the purpose of reducing the temperature of the material at the standard fineness so that its temperature shall not be raised above the critical degree by the reduction to special cement fineness, the conveyor $b$, in the embodiment of the invention illustrated in Figure 1, is made to deliver the material of standard fineness to a cooler $d$, from which it is in turn delivered to the mill $c$. The cooler $d$ may be of any suitable construction. As shown in Figure 1, it is a tubular cooler in which the cement moves upward through tubes $d'$ in a shell $e$ which is supplied with cooling water admitted at $e'$ and discharged at $e^2$. Below the lower tube sheet $d^2$ is a chamber $f$, in which is placed a mechanical mixer $f'$ and to which is supplied air, as indicated at $f^2, f^3$, whereby the cement material is reduced to a condition of fluidity and, being constantly supplied by the conveyor $f$, is made to flow upward through the tubes $d'$ of the cooler $d$. From the upper tube sheet $d^3$ the cement material flows out through a chute or conduit $d^4$ directly into the second mill $c$.

In the passage of the material through the cooler $d$, the temperature of the material is reduced to such a degree that the heat added to the material by the grinding to a special cement fineness in the mill $c$ will not raise the temperature of the material above the critical temperature at which the conversion of raw gypsum into plaster of Paris would take place. If, for example, it is assumed that the temperature of the material of standard fineness is 240° F. and that, under operating conditions, there is an increase of 100° F. in the reduction of the material to a special cement fineness, the temperature of the material would be raised to 340° F., which is much above the critical temperature at which the conversion of raw gypsum takes place. By the cooling of the cement material, which can be regulated by regulation of the flow of cooling water through the cooler, the temperature of the material of standard fineness is reduced to such a degree, say 125° F., that the heat added in the fine grinding will not raise the temperature of the material to the critical degree. The conversion of raw gypsum to plaster of Paris will therefore be wholly prevented and the finished product will therefore be of uniform quality.

Figure 2:
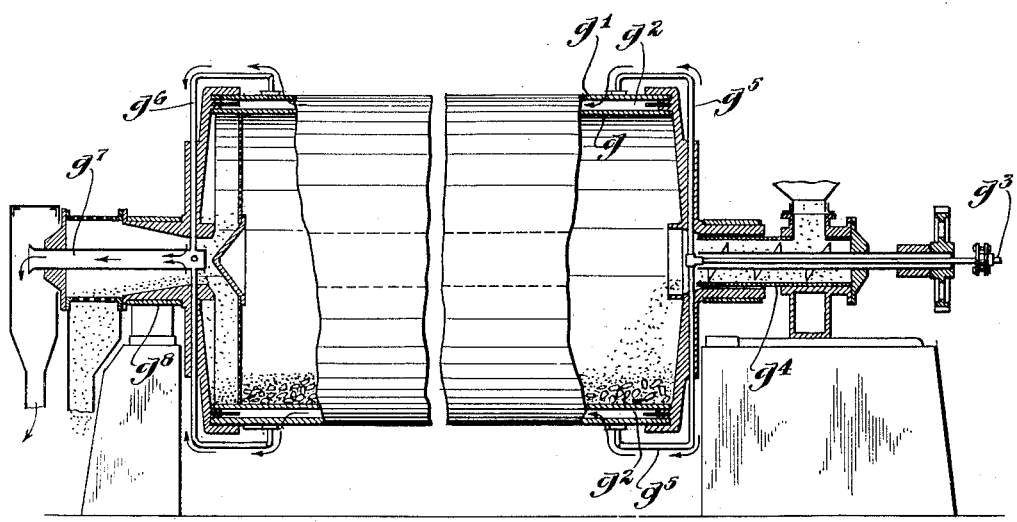
Figure 2 is a view in sectional elevation showing the cooling device incorporated with one of the mills.

Obviously the prevention of the heating of the material above the critical temperature might be accomplished by incorporation of cooling devices with one or the other of the grinding mills. Such an embodiment of the invention is illustrated in Figure 2, in which the shell $g$ of the mill is shown as jacketed by an outer shell $g'$, a space $g^2$ being left between the two shells, to which water may be supplied by a pipe $g^3$ which, with a suitable joint and stuffing box, passes centrally through the feeding trunnion $g^4$ of the mill and is connected through pipes $g^5$, carried by the head of the mill, with the water space $g^2$. Through similar pipes $g^6$ and a discharge pipe $g^7$ centrally placed in the delivery trunnion $g^8$ of the mill, the water which has absorbed heat from the mill and the material in the mill is discharged. By such means the temperature of the material may be reduced or kept below the critical temperature and the conversion of raw gypsum into plaster of Paris avoided.

It will be seen that the invention, so far as it finds expression in the method of grinding cement material, can be practised in various forms of apparatus.

I claim as my invention:

1. The method of grinding Portland cement material to special cement fineness, which consists in grinding the cement material to standard cement fineness, reducing the temperature of the material to a degree below that at which the heat added in subsequent grinding will not raise the temperature of the material above the critical degree of change of quality, and then grinding the material to special cement fineness.

2. The method of grinding Portland cement material to special cement fineness, which consists in grinding the cement material to standard Portland cement fineness, subsequently cooling the material to a degree such that the heat added in subsequent grinding will not raise the temperature of the material above the critical degree of change of quality, and then grinding the material to special cement fineness.

This specification signed this 2nd day of Nov., A. D. 1927.

POVL T. LINDHARD.